United States Patent [19]

Mizuno et al.

[11] 4,039,252
[45] Aug. 2, 1977

[54] FIELD-EFFECT LIQUID CRYSTAL-TYPE DISPLAY DEVICE

[75] Inventors: Fumio Mizuno; Fumio Takeuchi, both of Ibaragi; Shunsuke Kobayashi, Wako, all of Japan

[73] Assignee: Energy Systems, Ltd., Iruma, Japan

[21] Appl. No.: 571,565

[22] Filed: Apr. 25, 1975

Related U.S. Application Data

[63] Continuation-in-part of Ser. No. 422,870, Dec. 7, 1973, abandoned.

[30] Foreign Application Priority Data

Dec. 13, 1972 Japan .............................. 47-124954

[51] Int. Cl.² .............................................. G02F 1/13
[52] U.S. Cl. .............................................. 350/160 LC
[58] Field of Search .............................. 350/160 LC

[56] References Cited

U.S. PATENT DOCUMENTS 3,731,986   5/1973   Fergason ................. 350/160 LC X
3,947,185   3/1976   Maezawa ..................... 350/160 LC

OTHER PUBLICATIONS

Sussman; A., "Electrooptic Liquid Crystal Devices: Principles and Applications," IEEE Trans. Parts, Hybrids, and Packaging, vol. PHP-8, No. 4, Dec. 1972, pp. 26-37.

Gurtler; R. W., Maze; C., "Liquid Crystal Displays" IEEE Spectrum, vol. 9, Nov. 1972, pp. 25-29.

*Primary Examiner*—John K. Corbin
*Assistant Examiner*—Rolf Hille
*Attorney, Agent, or Firm*—D. Gordon Angus; Donald D. Mon

[57] ABSTRACT

A field-effect liquid-crystal type display device employing a twisted alignment method is provided with a pair of electrode glass plates spaced apart from each other and a field-effect type liquid crystal with a positive dielectric anisotropy loaded in the space defined by the plates, the plates being disposed in such a manner that an angle formed by the alignment treatment directions of the plates is changed a proper angle from 90°, so that the twisting direction of molecules in the liquid crystal is unified and the liquid crystal type display device is improved to show homogeneity, and thus to reduce the number of dirty domains or spots in display.

1 Claim, 7 Drawing Figures

FIELD-EFFECT LIQUID CRYSTAL-TYPE DISPLAY DEVICE

BACKGROUND OF THE INVENTION

This is a continuation-in-part of application Ser. No. 422,870, filed Dec. 7, 1973, now abandoned.

This invention relates to liquid-crystal type display devices and more particularly to a display device employing field-effect type liquid crystals in which twisted alignment of molecules in liquid crystals is utilized.

In general, such a liquid-crystal type display device employing field-effect type liquid crystals (especially nematic liquid crystals with a positive dielectric anisotropy), as is shown in FIG. 1, comprises a pair of transparent members 1 and 2 made of, for instance, glass on which transparent electrodes 3 and 4 made of, for instance, $SnO_2$ or $In_2O_3$ are respectively formed by vacuum evaporation, these transparent members 1 and 2 being disposed in parallel with each other. The plate-shaped space defined by the parallel transparent members 1 and 2 is loaded with liquid crystal 6 and then hermetically sealed with insulating materials 5. The external surfaces of the transparent members 1 and 2 are covered with a pair of polarizer-analyzers 7 and 8. Thus, the display device is designed so that when an electric voltage 9 is applied to the electrodes 3 and 4, it will carry out its display operation as required. The display device thus organized shows optical activity which rotates linearly polarized light by an angle between zero and 90° through which molecules are twisted when the applied voltage is zero; application of an AC or DC electric field controls and reduces optical activity (rotatory power) practically to zero; thus the panel shown in FIG. 1 (and FIGS. 2 and 3) works as an optical switch.

In a display device employing such a field-effect type liquid crystal, it is necessary to give a surface treatment to the electrode surface and the glass surface (hereinafter referred to as an electrode glass when applicable), that is, rub the electrode glass in order to align liquid crystal molecules in a certain direction.

In a conventional field-effect liquid-crystal type display device as is shown in FIG. 2, a pair of electrode glass plates 11 and 12 which are subjected to a surface treatment so that longer molecular axes of a liquid crystal are aligned in a certain direction are assembled in such a manner that the directions 13 and 14 of their alignment treatments (hereinafter referred to as alignment treatment directions 13 and 14 when applicable) make right angles with each other as is shown in FIG. 4. More specifically, for instance, if the alignment treatment direction 13 of the electrode glass plate 11 is rendered to be in parallel with the side a—b of the electrode glass plate 11 while the alignment treatment direction 14 of the electrode glass plate 12 is rendered to be in parallel with the side a—d of the electrode glass plate 11, the alignment treatment directions 13 and 14 make right angles with each other. The plate-shaped space defined between the electrode glass plates 11 and 12 is loaded with a liquid crystal, and is hermetically sealed with insulating materials at both ends thereof in the same manner as shown in FIG. 1. In other words, of the longer molecular axes 6a, 6b, 6c, . . . 6k, 6l and 6m, of the liquid crystal, the longer molecular axes 6a and 6m, which are in contact with the electrode glass plates 11 and 12, respectively, are coincident in direction with the alignment treatment directions 13 and 14 of the electrode glass plates, respectively; however, the other longer molecular axes 6b through 6d are affected by the alignment treatment directions 13 and 14 because the former is different in direction from the latter, as a result of which these longer molecular axes 6b through 6d are elastically and successively twisted and are disposed in the form of a twisted alignment as is apparent from FIG. 2.

In the liquid crystal type display device employing such a twisted alignment as described in FIG. 2 (90° twist) there is a disadvantage in that it contains non-homogeneities (there exist a number of dirty domains or spots) under both the conditions of quiescence (no voltage) and of application of voltage; the size of these dirty domains or spots (non-homogeneities) are several mm and the origin of these non-homogeneities is the existence of clockwise twists of the molecules and counterclockwise twists (not shown) whose optical properties differ from each other. When the twist angle is 90° the occurrence of clockwise and reverse twist is an equal-weight probability. Furthermore, as the elastic energies necessary for the clockwise and counterclockwise twists (that is, energies necessary for counteracting against the attractions between molecules) are equal to each other, the probability of twisting molecules of the liquid crystal clockwise is equal to that of twisting molecules of the same counterclockwise starting from the alignment treatment direction of the electrode glass plate 11 to that of the electrode glass plate 12. That is, the alignment of the molecules of the liquid crystal is effected in such a manner that in some part of the liquid crystal molecules are twisted clockwise while in some part of the liquid crystal the molecules are twisted counterclockwise, that is, the alignment directions of the molecules are partially rendered to be different from one another. As a result, there occur irregularities which give rise to reveal unwanted dirty domains or spots in the layer of the liquid crystal and non-homogenous displays are caused. This is a serious disadvantage accompanying the conventional liquid crystal type display device (90° twist) described above. As far as the threshold voltage is concerned, it is known that it depends on the twist angle and it decreases as the twist angle is decreased; therefore it is possible to reduce the threshold voltage by reducing the twist angle. It is known also that the electro-optical properties including threshold of clockwisely twisted and reversely twisted cells are different, which is also an origin of non-homogeneities.

SUMMARY OF THE INVENTION

Accordingly an object of this invention is to provide a field-effect liquid-crystal type display device in which all of the above-described difficulties accompanying conventional field-effect liquid-crystal type display devices employing the twisted alignment of 90° are eliminated.

Another object of the invention is to produce a liquid-crystal type display device which is remarkably improved to show homogeneity in display.

The foregoing objects and other objects of this invention have been achieved by the provision of a field-effect liquid-crystal type display device comprising a pair of transparent substrates spaced apart from each other and provided with transparent electrodes, respectively, and a liquid crystal of a field-effect type loaded in the space between the transparent substrates, said transparent substrates being disposed in such a manner that an angle formed by the alignment treatment directions of the transparent substrates is changed by a proper angle from 90°.

The nature, utility and principle of this invention will become more apparent from the following description and the appended claims when read in conjunction with the accompanying drawings, in which like parts are designated by like reference numerals and characters.

DETAILED DESCRIPTION OF THE INVENTION

Figure 1:
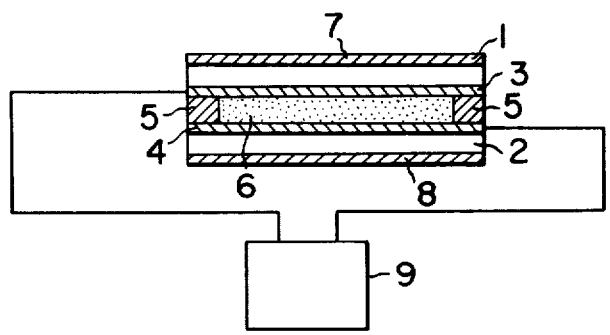
FIG. 1 is a schematic explanatory diagram illustrating a fundamental arrangement of a liquid-crystal type display device.
Figure 2:
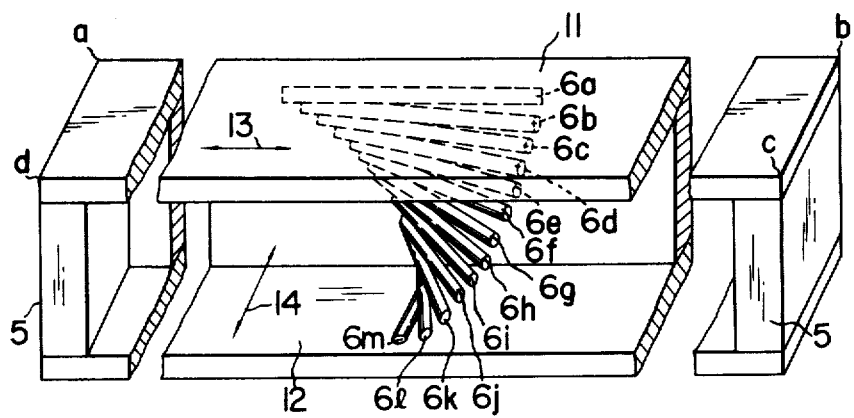
FIG. 2 is a perspective view of a conventional liquid-crystal type display device employing the twisted alignment, shown partially cut away, for illustrating the alignment of longer molecular axes of a liquid crystal therein.
Figure 3:
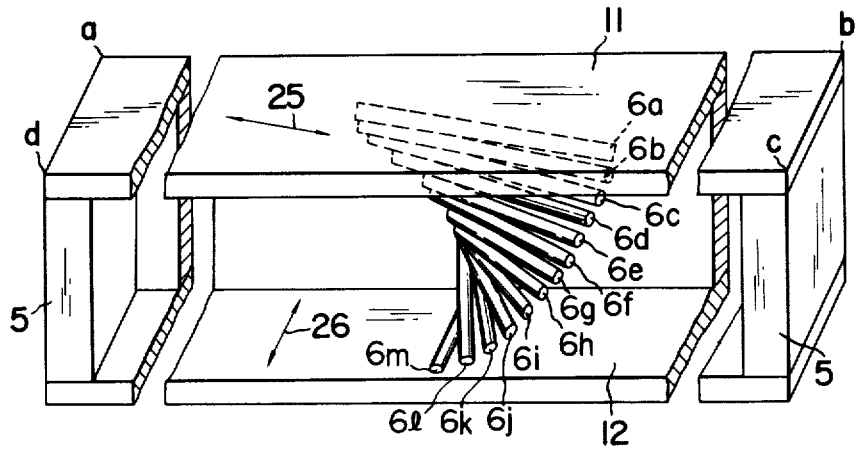
FIG. 3 is also a perspective view of one example of a liquid-crystal type display device according to this invention, with parts cut away, for illustrating the alignment of longer molecular axes of a field-effect liquid crystal therein.
Figure 4:
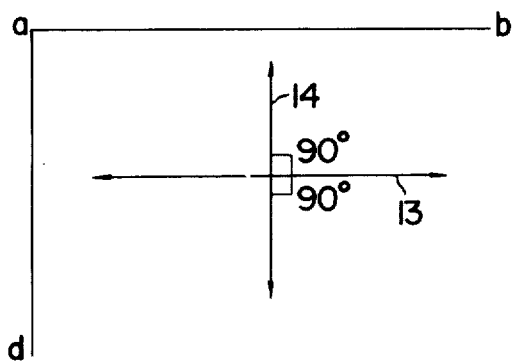
FIG. 4 is an explanatory diagram illustrating the alignment treatment directions of a pair of electrode glass plates in the conventional liquid-crystal type display device.
Figure 5:
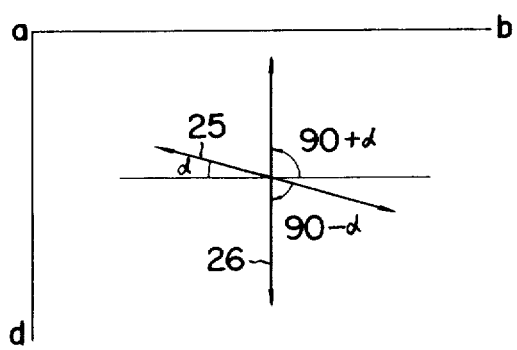
FIG. 5 is also an explanatory diagram illustrating the alignment treatment directions of two electrode glass plates in the field-effect liquid-crystal type display device according to this invention.

One example of a field-effect liquid crystal type display device according to this invention will be described with reference to FIGS. 3, 5 and 6 in which the parts similar to or corresponding to those in FIGS. 1 and 2 are designated by the same reference numerals or characters and the descriptions of them are accordingly omitted. The field-effect liquid-crystal type display device according to the invention comprises a pair of electrode glass plates 11 and 12 which are disposed in parallel with each other. The alignment directions 25 and 26 of the electrode glass plates 11 and 12 are treated so that the angle formed by the alignment directions 25 and 26 is changed by a suitable angle from 90°. For instance, if the angle formed by the alignment direction 25 and the side a—b of the electrode glass plate 11 is changed by an angle α clockwise and the alignment treatment direction 26 of the electrode glass plate 12 is rendered to be in parallel with the side a—d of the electrode glass plate 11, the difference in angle between the alignment treatment directions 25 and 26 will be (90 − α)° and (90 + α)° as is shown in FIG. 5, that is, the angle formed by the alignment treatment directions 25 and 26 is changed by an angle α from 90°. The angle α should be in the range of from 5° to 10°.

In the field-effect liquid-crystal type display device thus organized, of the longer molecular axes 6a, 5b, 6c . . . 6k, 6l and 6m of the liquid crystal sealed in the electrode glass plates 11 and 12 disposed in parallel with each other, the directions of the longer molecular axes 6a and 6m which are respectively in contact with the electrode glass plates 11 and 12 are coincident with the alignment treatment directions 25 and 26 of the electrode glass plates 11 and 12, respectively, while the other longer molecular axes 6b through 6d are affected by the alignment treatment directions 25 and 26 simultaneously and are successively twisted by the molecular attractions and are therefore disposed in the form of a twisted alignment. In this case, since the angle formed by the alignment treatment directions of the two electrode glass plates 11 and 12 is (90 − α)° or (90 + α)° as was described before, the longer molecular axes are successively twisted up to (90 − α)° clockwise starting from the alignment treatment direction of the electrode glass plate 11 to that of the electrode glass plate 12 while they are successively twisted up to (90 + α)° counterclockwise starting from the alignment treatment direction of the electrode glass plate 11 to that of the electrode glass plate 12. In this connection, the elastic energy necessary for twisting a longer molecular axis clockwise is however smaller than that necessary for twisting a longer molecular axis counterclockwise. Accordingly, all of the molecules in the liquid crystal are twisted toward a direction where the elastic energy necessary for the twisting of the longer molecular axis is smaller, that is, they are twisted clockwise starting from the alignment treatment direction of the electrode glass plate 11 to that of the electrode glass plate 12, and none of them is twisted counterclockwise. Thus existence of the region with reverse twist can be avoided under the quiescent condition.

Figure 6:
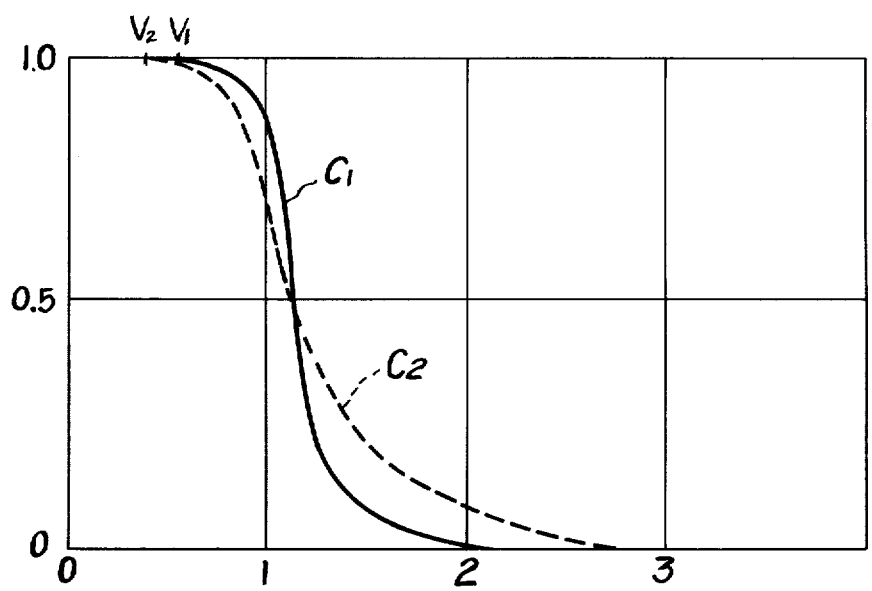
FIG. 6 is a datum showing the difference in electro-optical properties of a 90° twist cell and an 80° twist cell.

In the graph of FIG. 6, the abscissas represent applied volts (RMS), an actual test having been made at 1 KHz. The ordinates represent normalized light transmission, the scale going from 0 to complete (1.0) light transmission. The curve $C_1$ is the characteristic curve of a 90° twist cell and the broken line curve $C_2$ is the characteristic curve of an 80° twist cell. As seen in FIG. 6 there is full light transmission up to a voltage $V_1$, less than one volt, for the 90° cell, after which the transmission decreases rapidly with increasing voltage. The voltage $V_1$ is the threshold voltage for the 90° cell. It is seen from curve $C_2$ that the threshold voltage $V_2$ for the 80° cell is significantly less than the voltage $V_1$ of the 90° cell. Thus in the case of the 80° cell there is a full light transmission up to the voltage $V_2$ after which the transmission decreases rapidly with increasing voltage.

If the departure of the twist angle from 90° is less than 5°, that is, a twist angle above 85°, the threshold voltage is not decreased from that of 90° as much as in the case of the 80° twist angle shown in FIG. 6. Hence the homogeneity decreases relatively rapidly above 85° and up to 90° twist.

Figure 7:
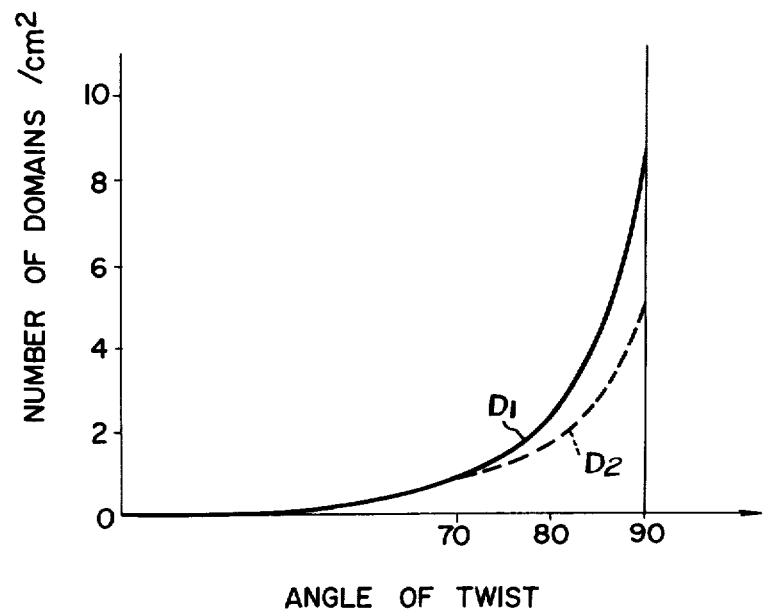
FIG. 7 is a datum showing the number of domains per cm$^2$ (existing number of dirty area and spots) versus twisting angle; curve $D_1$ is a datum for quiescent condition and $D_2$ is that after application of operating voltage.

The meaning of good homogeneity in a display panel is that there exist few dirty areas (domains) and spots. FIG. 7 shows the numbers of such dirty domains or spots which appeared in the display panels versus twist angles. The curves $D_1$ and $D_2$ correspond to the condition of quiescent and operation. Several numbers of domains are frequently observed in the region above 80°. As twist of angles are reduced to be smaller, then non-homogeneities degrees are as shown in FIG. 7. However, contrast-ratio decreases relatively rapidly by decreasing the twist angle below 80°. Accordingly it is seen that a twist angle in the range of 80° to 85°, that is, a decrease from 90° of from 5° to 10°, produces a marked improvement in homogeneity over any other angle range, and in this range of 5° to 10° from the 90° twist, a reduction of 10° from the 90° twist, that is a twist angle of 80°, has been found to be the optimum.

As is shown in FIG. 6, the threshold voltage of the cell of 80° twist is lower than that of 90° twist, however, contrast of the 80° twist cell is poorer than that of the 90° twist cell in the region of the operating voltage (in the vicinity of 2 volts RMS), and further the numbers of non-homogenities decrease monotonically by decreasing twist angles as shown in FIG. 7; therefore the optimum condition is determined by the trade-off between threshold voltage and contrast ratio and by that of between homogeneity and contrast ratio. This dictates that the optimum value of $\alpha$ is 10°. Furthermore, even when there exists a region with twist angles larger than 80° included among the region of 80° twist, the latter will respond first to the electric field and the former (the greater than 80° twist) are unified with the 80° twist angles. Thus, a region or area with other than 80° twist will disappear. The above-mentioned situation is effective for the materials for which the following relation holds: $k_{33} - 2k_{22} > 0$, where $k_{33}$ and $k_{22}$ are elasti-constants for bend and twist, respectively, of the liquid crystal.

As is apparent from the above description, in the field-effect liquid-crystal type display device employing the twisted alignment according to this invention, the difference between, or the angle formed by the alignment treatment directions of the electrode glass plates spaced apart from each other is $(90 - \alpha)°$. Accordingly, the twisting direction of molecules in the liquid crystal is unified, that is, there is no region in the liquid crystal where the twisting direction of molecules therein is partially different from another. Thus, the field-effect liquid-crystal display device according to this invention provides a homogeneity in the displayed patterns like alpha-numerics and other symbols and their background under both the condition of quiescence and of application of voltage which is remarkably improved in its display effects. Liquid crystals, being well known, require no further explanation, and any of the various liquid crystals may be used in the display device.

We claim:

1. A liquid crystal type display device comprising a pair of transparent members provided with transparent electrodes, respectively, and a liquid crystal of a field-effect type loaded in the space formed by the transparent members, said transparent members being disposed in such a manner that the angle formed by the alignment treatment directions of the transparent members is changed by five degrees from ninety degrees, whereby the homogeneity of the display is significantly improved from that obtained when the twist angle is less than five degrees or more than 10°, from 90°.

* * * * *